(12) United States Patent
Shamasundar

(10) Patent No.: US 10,882,638 B2
(45) Date of Patent: Jan. 5, 2021

(54) SYSTEMS AND METHODS FOR AIRCRAFT ADAPTIVE GROUND SAFETY LIGHTING USING EDGE NODES

(71) Applicant: HONEYWELL INTERNATIONAL INC., Morris Plains, NJ (US)

(72) Inventor: Raghu Shamasundar, Bangalore (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 13 days.

(21) Appl. No.: 16/385,571

(22) Filed: Apr. 16, 2019

(65) Prior Publication Data

US 2020/0331628 A1 Oct. 22, 2020

(51) Int. Cl.
*B64D 47/06* (2006.01)
*G08G 5/00* (2006.01)
*B64F 5/60* (2017.01)

(52) U.S. Cl.
CPC ............... *B64D 47/06* (2013.01); *B64F 5/60* (2017.01); *G08G 5/0013* (2013.01)

(58) Field of Classification Search
CPC .... B64D 47/02; B64D 2203/00; B64D 45/00; B60Q 2400/50; B64F 1/20; F21W 2107/30; B60K 2370/797; G01C 21/365
See application file for complete search history.

(56) References Cited

U.S. PATENT DOCUMENTS

| | | | |
|---|---|---|---|
| 9,567,102 B1 | 2/2017 | Ross | |
| 9,889,948 B2 | 2/2018 | Hessling Von Heimendahl et al. | |
| 10,202,205 B2 | 2/2019 | Schoen et al. | |
| 2015/0203023 A1* | 7/2015 | Marti | B60Q 1/503 340/425.5 |
| 2017/0233101 A1* | 8/2017 | Hessling-Von Heimendahl | F21V 19/002 362/470 |
| 2018/0009547 A1 | 1/2018 | Brewer | |
| 2018/0050821 A1* | 2/2018 | Schoen | B64D 47/06 |
| 2019/0359349 A1* | 11/2019 | Hessling-Von Heimendahl | F21S 43/14 |
| 2020/0122857 A1* | 4/2020 | Jha | B64D 47/06 |

* cited by examiner

*Primary Examiner* — Mirza F Alam
(74) *Attorney, Agent, or Firm* — Lorenz & Kopf, LLP

(57) ABSTRACT

Provided are technologically improved adaptive ground safety lighting systems and related methods. The method includes receiving cockpit data providing a weight on wheels (WOW) indicator, an off-runway indicator, an engine off indicator, and an engine temperature, and receiving, from a connected-light assembly comprising a plurality of connected lighting edge nodes, a respective temperature measurement and wind measurement. Upon determining that there is a concurrent occurrence of (a) WOW indicator asserted, (b) off-runway indicator asserted, and (c) engine off indicator asserted, an environmental map around the aircraft is constructed, and a dissipation timer is started. A caution volume surrounding the engine is generated based on the heat dissipation factor of the engine and other received data, and the plurality of lighting edge nodes are illuminated in accordance with the caution volume.

20 Claims, 5 Drawing Sheets

SYSTEMS AND METHODS FOR AIRCRAFT ADAPTIVE GROUND SAFETY LIGHTING USING EDGE NODES

TECHNICAL FIELD

The technical field generally relates to ground safety aids, and more particularly relates to systems and methods for aircraft adaptive ground safety lighting using connected lighting edge nodes.

BACKGROUND

Ground staff at an airport are individuals who do not fly the planes themselves but are responsible for creating a positive experience for passengers in both the aircraft and the terminal. Some of the ground staff perform duties to ensure the safety and comfort of airline passengers and crew members, including stocking aircraft with refreshments, and cleaning the plane and runway between flights. Some of the ground staff perform maintenance and other operational duties.

Generally, ground staff are required to follow specific ground standard operating procedures and focus on safety in the performance of their duties. With respect to the aircraft engine, ground safety systems may generate on a display associated advisories and alerts related to the engine status (i.e., when it is on/running and when it is off), and these are a trigger for the ground staff to follow a respective published ground procedure. One example advisory is an "engine ground running" advisory. Commonly, during an engine ground running advisory, all certified ground staff must follow the up-to-date published engine running procedures, which are defined in the applicable Aircraft Maintenance Manual (AMM) as well as in the Maintenance Organization Exposition. Responsive to an "engine off" advisory, there are also respective published ground procedures to follow. Engine off procedures are generally based on instructions from a manual provided by the manufacturer of the specific engine in the aircraft, to instruct maintenance personnel on the engine's power and its heat dissipation factor during the "engine off" conditions.

In addition to knowing how to respond to these situations, all certified ground staff are expected to have appropriate training to be able to rapidly respond to potential but unexpected occurrences during ground operations. Further, various sources of information may be available to a pilot and the ground staff, and it is up to their discretion how to use this information and take safety actions during ground procedures.

The described ground safety systems and associated ground operating procedures are limited because they based on published information and rotely followed, providing limited accuracy and no adaptability to real-time environmental and aircraft factors.

Accordingly, improved ground safety systems and methods that increase accuracy and safety during ground procedures are desirable. It is desirable to make them adaptable, responsive to real-time environmental information and available cockpit data. It is further desirable to utilize available connected lighting edge nodes in ground safety systems, to provide effective visual cues in an intuitive and context-based system. The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An adaptive ground safety lighting system for an aircraft is provided. The system includes: a connected-light assembly comprising a plurality of connected lighting edge nodes distributed around an external surface of the aircraft, each connected lighting edge node of the plurality of connected lighting edge nodes comprising a light head, a transceiver, a temperature sensor, and a wind sensor; a source of cockpit data providing a weight on wheels (WOW) indicator, an off-runway indicator, an engine off indicator, and an engine temperature; and a controller with a processor programmed to: receive the cockpit data; receive, from each connected lighting edge node in the connected-light assembly, respective sensed data comprising a temperature measurement and wind measurement; upon a concurrent occurrence of (a) WOW indicator asserted, (b) off-runway indicator asserted, and (c) engine off indicator asserted, construct an environmental map around the aircraft by associating received sensed data with a location on the surface of the aircraft, for each of the plurality of lighting edge nodes; begin a dissipation timer; and (i) perform a calculation using the engine temperature, the environmental map, and historical engine data, to generate a caution volume surrounding the engine, and to assign a color to the caution volume; (ii) command the plurality of lighting edge nodes to illuminate in accordance with the caution volume and color; (iii) update the environmental map based on received sensed data from each of the plurality of lighting edge nodes; and repeat (i)-(iii) until the engine temperature is less than a first temperature threshold; and when the engine temperature is less than the first temperature threshold, stop the dissipation timer and store its value; and update the historical data based on the dissipation timer value.

A method for adaptive ground safety lighting for an aircraft is provided. The method includes: at a controller comprising a processor programmed with a lighting program, performing the operations of: receiving cockpit data providing a weight on wheels (WOW) indicator, an off-runway indicator, an engine off indicator, and an engine temperature; receiving, from a connected-light assembly comprising a plurality of connected lighting edge nodes on an external surface of the aircraft, respective sensed data comprising a temperature measurement and a wind measurement; determining that there is a concurrent occurrence of (a) WOW indicator asserted, (b) off-runway indicator asserted, and (c) engine off indicator asserted; and responsive to the concurrent occurrence of (a), (b), and (c): constructing an environmental map around the aircraft by associating received sensed data with a location on the surface of the aircraft, for each of the plurality of connected lighting edge nodes; beginning a dissipation timer; (i) performing a calculation using the engine temperature, the environmental map, and historical engine data, to generate a caution volume surrounding the engine, and to assign a color to the caution volume; (ii) commanding the plurality of lighting edge nodes to illuminate in accordance with the caution volume and color; (iii) updating the environmental map based on received sensed data from each of the plurality of lighting edge nodes; and repeating (i)-(iii) until the engine temperature is less than a first temperature threshold; and when the engine temperature is less than the first temperature threshold, stopping the dissipation timer and storing its value; and updating the historical data based on the dissipation timer value.

Another adaptive ground safety lighting system for an aircraft is provided. The system includes: a connected-light assembly comprising a plurality of connected lighting edge nodes distributed around an external surface of the aircraft, each connected lighting edge node of the plurality of connected lighting edge nodes comprising a light head, a transceiver, a temperature sensor, and a wind sensor; a source of cockpit data providing a weight on wheels (WOW) indicator, an off-runway indicator, an engine off indicator, and an engine temperature; a source of an air traffic control (ATC) clearance command; and a controller with a processor programmed to: receive the cockpit data; receive an ATC clearance command; receive, from each connected lighting edge node in the connected-light assembly, a unique location on the surface of the aircraft and respective sensed data comprising a temperature measurement and wind measurement; and upon a concurrent occurrence of (a) WOW indicator asserted, (b) off-runway indicator asserted, and (c) engine off indicator asserted, construct an environmental map around the aircraft by associating the received sensed data with the unique locations on the surface of the aircraft, for each of the plurality of lighting edge nodes; begin a dissipation timer; (i) perform a calculation using the engine temperature, the environmental map, the ATC clearance command, and a heat dissipation factor, to generate a caution volume surrounding the engine, and to assign a color to the caution volume; (ii) command the plurality of lighting edge nodes to illuminate in accordance with the caution volume and color; (iii) update the environmental map based on received sensed data from each of the plurality of lighting edge nodes; and repeat (i)-(iii) until the engine temperature is less than a first temperature threshold; and, when the engine temperature is less than the first temperature threshold, stop the dissipation timer and store its value; command each of the plurality of lighting edge nodes to assume a standby orientation and illumination color; and update the historical data based on the dissipation timer value.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

As mentioned, available ground safety systems and their associated ground procedures are limited because they are based on published information and rotely followed, rather than being adaptive to real-time environmental and real-time changes in any aircraft cockpit data. These limitations reduce their accuracy, for example, of determining the heat of an engine. Further, currently there are no effective visual cues related to the engine status. The proposed adaptive ground safety lighting system (FIG. 1, system 102) provides a technical solution to at least these technical problems.

The adaptive ground safety lighting system 102 is an easy augmentation for any aircraft equipped with a plurality of connected lighting edge nodes and does not require any special or additional instrumentation and equipage. The adaptive ground safety lighting system 102 is adaptable to real-time environmental information and current available aircraft cockpit data; the adaptive ground safety lighting system 102 generates ground procedure information in the form of advisories and/or alerts by coordinating the connected lighting edge nodes to provide visual cues that are intuitive and context-based. More specifically, exemplary embodiments of the adaptive ground safety lighting system 102 process various combinations of cockpit information, ground systems' data, such as a flight position, and air traffic control data with real time flight data (including runway and terminal area procedures) to generate the advisories and/or alerts for the ground staff in an efficient way that will improve the safety of ground maintenance activities. The figures and descriptions below provide more detail.

Figure 1:
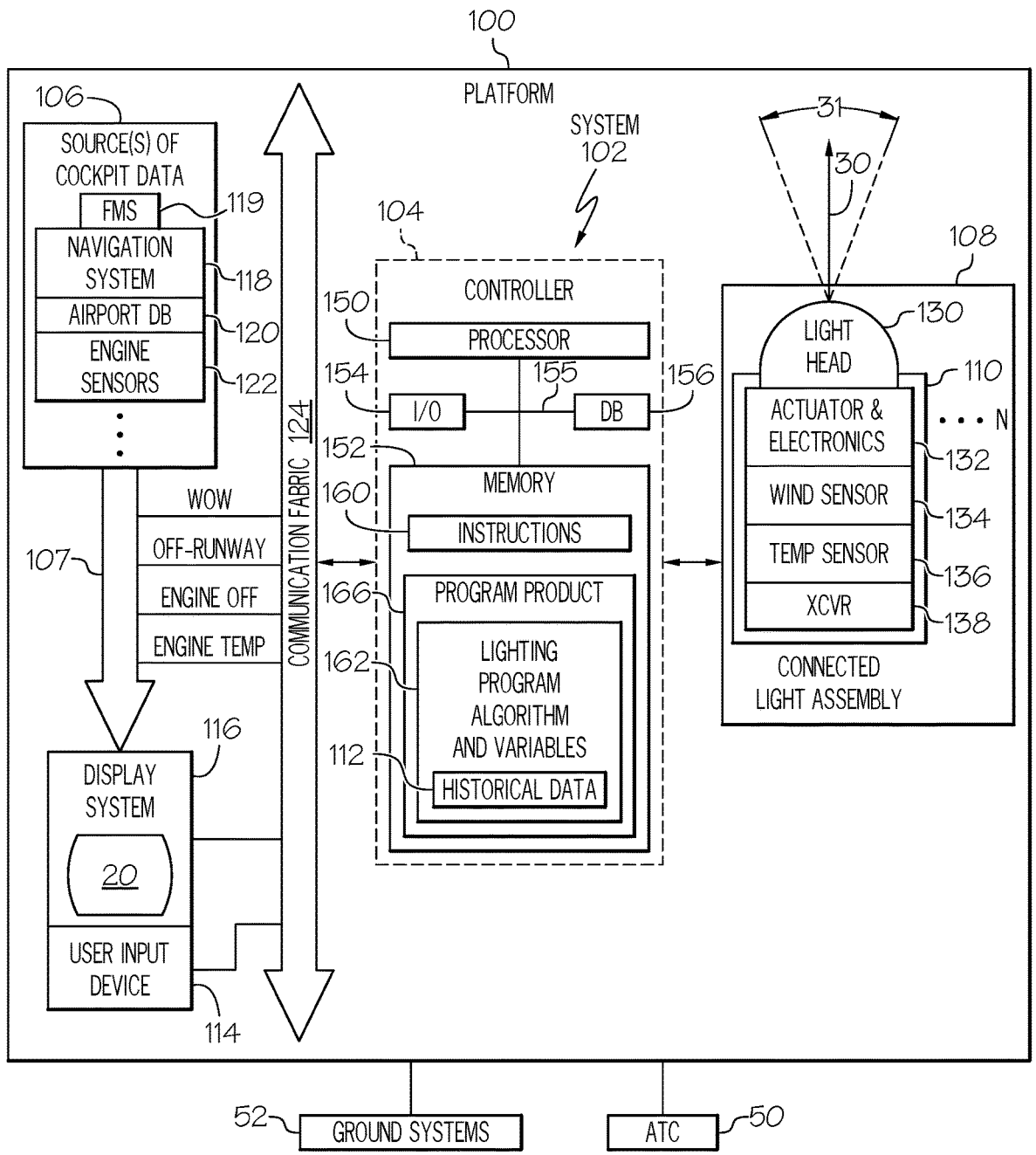
FIG. 1 is a block diagram of an adaptive ground safety lighting system for an aircraft, in accordance with an exemplary embodiment.
Figure 2:
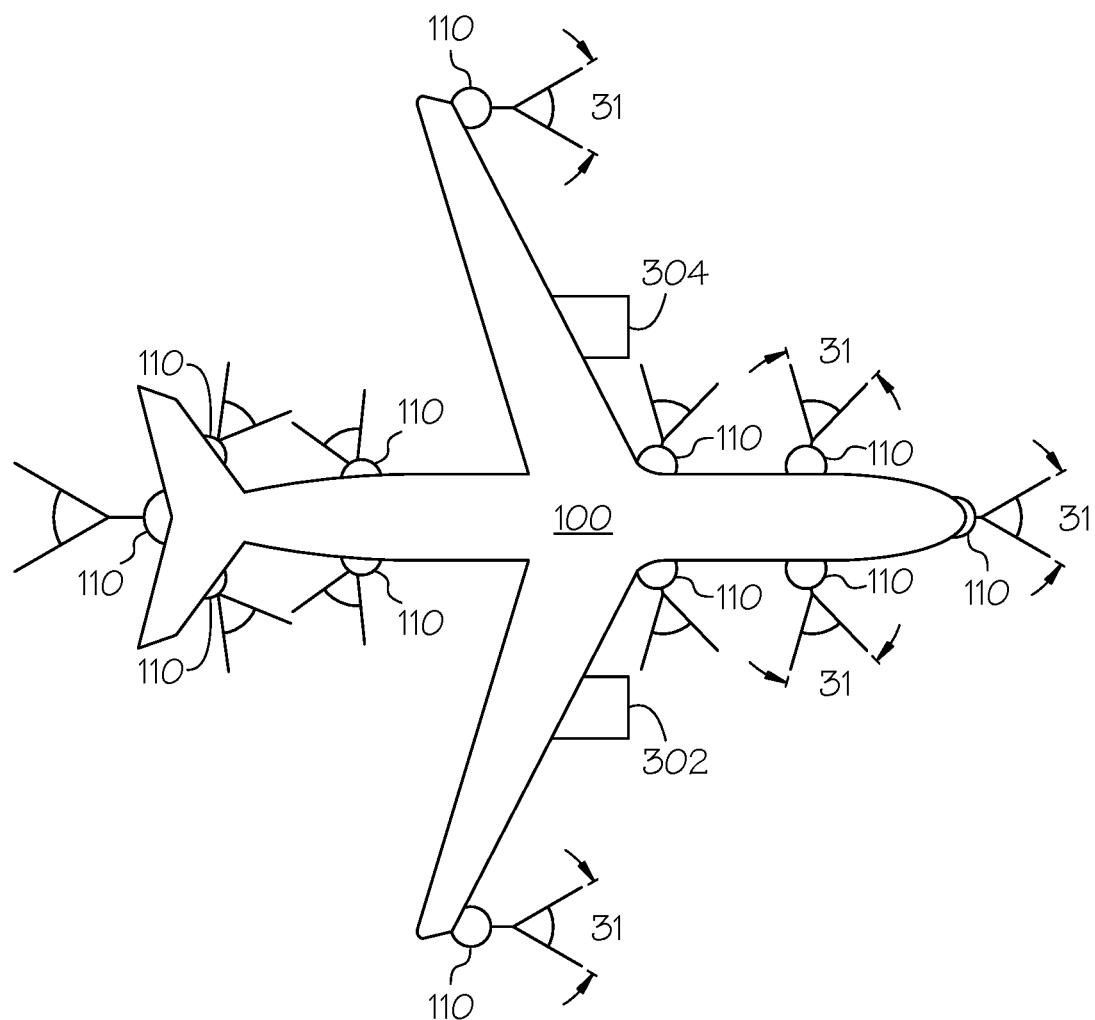
FIG. 2 is an illustration showing a plurality of connected lighting edge nodes distributed around an external surface of the aircraft, in accordance with an exemplary embodiment.

Turning now to FIGS. 1-2, in an embodiment, the adaptive ground safety lighting system 102 (also referred to herein as "system" 102) is generally associated with a mobile platform 100. In various embodiments, the mobile platform 100 is an aircraft, and is referred to as aircraft 100. Exemplary embodiments of the adaptive ground safety lighting system 102 provide a technical solution to the above-mentioned technical problems in the form of a controller 104 (which may also be referred to herein as a control module) embodying a processor 150 programmed with novel rules and parameters (lighting program 162). The disclosed controller 104 receives cockpit data 107, including a weight on wheels (WOW) indicator, an off-runway indicator, an engine off indicator, and an engine temperature. The controller 104 also receives, from each lighting edge node 110 in a connected-light assembly 108, respective sensed data comprising a current temperature measurement and a current wind measurement. The controller 104 processes the received information with historical data to generate therefrom an environmental map of the area surrounding the aircraft 100 and commands the plurality of lighting edge nodes 110 to illuminate based on the environmental map. In various embodiments, the controller 104 also receives and processes data and information from air traffic control 50 and/or one or more ground systems 52 and commands the plurality of lighting edge nodes 110 to illuminate additionally based those inputs. These functions and process steps are described in more detail below.

The controller 104 may be operationally coupled to any combination of the following systems and apparatus: one or more sources 106 of cockpit data (including an inertial navigation system 118; an airport features database 120; an engine sensor system 122); a connected-light assembly 108 (comprised of a plurality (N) of lighting edge nodes 110); a historical database 112; a communication system and fabric 124; a display system 116; and a user input device 114. In some embodiments, the controller 104 is also operationally coupled to external sources, such as air traffic control (ATC) 50 and other ground system 52 that communicate wirelessly with the controller 104.

In some embodiments, the controller 104 may be integrated within a preexisting mobile platform management system, avionics system, cockpit display system (CDS), flight controls system (FCS), or flight management system (FMS). Although the controller 104 is shown as an independent functional block, onboard the aircraft 100, in other embodiments, it may exist in an electronic flight bag (EFB) or portable electronic device (PED), such as a tablet, cellular phone, or the like. In embodiments in which the controller is within an EFB or a PED, a display system 116 and a user input device 114 may also be part of the EFB or PED.

As shown in FIG. 2, in various embodiments, the connected-light assembly 108 comprises a plurality of connected lighting edge nodes 110 distributed around an external surface of the aircraft 100. Returning to FIG. 1, it is seen that each lighting edge node 110 of the plurality of edge nodes 110 comprises a light head 130 (including actuator and electronics 132, as required to articulate the light head 130 responsive to commands from the controller 104), a transceiver 138 for communicating with the controller 104, a temperature sensor 136, and a wind sensor 134. Each of the sensors (136, 134) are understood to have associated circuitry for converting real-time sensed information into an electrical signal for transmission and processing. Each lighting edge node 110 of the plurality of edge nodes 110 has a unique location on and around the surface of the aircraft 100 and is configured to communicate with each of the other connected lighting edge nodes 110, and with the controller 104, to share its unique location and unique sensed information. The location-specific sensed information is processed by the controller 104 to construct the environmental maps described herein.

When a light head 130 receives a command to illuminate, the light head 130 projects a three-dimensional beam of light 31 along a beam axis 30 responsive to the command. The beam of light 31 is three-dimensional, having a generally conical shape surrounding the beam axis 30, extending radially therefrom. A command to illuminate includes an orientation. As used herein, an orientation is the same as a direction for the beam axis 30 to point to. In various embodiments, a command to illuminate also includes one or more colors. In various embodiments, as part of generating the caution volume, the processor determines a luminous intensity for each respective connected lighting edge nodes and the command to illuminate also includes the respective luminous intensity. In an embodiment, responsive to the command to illuminate, the actuator and electronics 132 of the light head change the orientation of the light head 130 (and resulting beam axis 30), with respect to the aircraft 100, and the color emitted by the light head 130. In another embodiment, responsive to the command to illuminate, the actuator and electronics 132 of the light head change the orientation of the light head 130, the color emitted by the light head 130, and the luminous intensity of the beam of light projected by the light head 130.

The inertial navigation system 118 provides real-time aircraft state data. Real-time aircraft state data may include any of: an instantaneous location (e.g., the latitude, longitude, orientation), an instantaneous heading (i.e., the direction the rotorcraft is traveling in relative to some reference), a flight path angle, a vertical speed, a ground speed, an instantaneous altitude (or height above ground level), and a current phase of flight of the aircraft 100. As used herein, "real-time" is interchangeable with current and instantaneous. The inertial navigation system 118 may be realized as including a global positioning system (GPS), inertial reference system (IRS), or a radio-based navigation system (e.g., VHF omni-directional radio range (VOR) or long-range aid to navigation (LORAN)), and may include one or more navigational radios, barometers, or other sensors suitably configured to support operation of a flight management system (FMS), as will be appreciated in the art. In various embodiments, the data referred to herein as the real-time rotorcraft state data may be referred to as navigation data. The real-time aircraft state data is made available, generally by way of the communication system and fabric 124, so other components, such as the controller 104 and the display system 116, may further process and/or handle the rotorcraft state data.

In various embodiments, the communications system and fabric 124 is configured to support instantaneous (i.e., real time or current) communications between on-board systems, the controller 104, and ATC 50. As a functional block, the communications system and fabric 124 may represent one or more transmitters, receivers, and the supporting communications hardware and software required for components of the system 102 to communicate as described herein. In various embodiments, the communications system and fabric 124 may have additional communications not directly relied upon herein, such as bidirectional pilot-to-ATC (air traffic control) communications via a datalink, and any other suitable radio communication system that supports communications between the aircraft 100 and various external source(s).

The user input device 114 and the controller 104 are cooperatively configured to allow a user (e.g., a pilot, co-pilot, or crew member) to interact with display devices in the display system 116 and/or other elements of the system 102, as described herein. Depending on the embodiment, the user input device 114 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 114 is configured as a touchpad or touchscreen, it may be integrated with the display system 116. As used herein, the user input device 114 may be used by a pilot to communicate with external sources, to modify or upload the program product 166, etc. In various embodiments, the display system 116 and user input device 114 are onboard the aircraft 100 and are also operationally coupled to the communication system and fabric 124. In some embodiments, the controller 104, user input device 114, and display system 116 are configured as a control display unit (CDU).

The controller 104 may perform display processing. As such, the controller 104 generates display commands for the display system 116 to cause the display device 20 to render thereon the various graphical user interface elements, tables, icons, alerts, menus, buttons, and pictorial images, as described herein. The display system 116 is configured to continuously receive and process the display commands from the controller 104. The display system 116 includes a display device 20. In various embodiments described herein, the display system 116 includes a synthetic vision system (SVS). In exemplary embodiments, the display device 20 is realized on one or more electronic display devices, such as a multi-function display (MFD) or a multi-function control display unit (MCDU), configured as any combination of: a head up display (HUD), an alphanumeric display, a vertical situation display (VSD) and a lateral navigation display (ND).

The controller 104 may perform graphical processing. Responsive to display commands, renderings on the display system 116 may be processed by a graphics system, components of which may be integrated into the display system 116 and/or be integrated within the controller 104. Display methods include various types of computer generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various formatting techniques for visually distinguishing objects and routes from among other similar objects and routes. The controller 104 may be said to display various images and selectable options described herein. In practice, this may mean that the controller 104 generates display commands, and, responsive to receiving the display commands from the controller 104, the display system 116 displays, renders, or otherwise visually conveys on the display device 20, various graphical images associated with operation of the aircraft 100.

Cockpit data 107 is data that is available to the pilot or crew in the cockpit of the aircraft. In various embodiments, cockpit data 107 is communicated to the pilot and crew via graphical displays on the display system 116. In practice, there are a multitude of cockpit data 107 providing a respective multitude of information and sourced by a multitude of aircraft systems. For example, sources of cockpit data may include the navigation system 118, an airport database 120, a flight management system (FMS) 119, and sensors, such as engine sensors 122. The engine sensors 122 detect various aspects of engine performance and state. Engine sensors 122 also provide an engine status (for example, engine off, or engine running), and provide the engine temperature. The airport database 120 stores airport maps with features such as runways, taxiways, and gates. The airport database 120 can be processed with data from other sources 106 of cockpit data, such as a flight management system (FMS 119), to generate an "off runway" signal that indicates when an aircraft that is traveling on the ground has left a formally demarked runway and entered other zones, such as taxiways and gates. The FMS 119 or other source 106 of cockpit data may also process navigation system 118 information or other sensor information and generate a weight on wheels WOW signal.

In various embodiments described herein, cockpit data 107 includes (i) the WOW indicator, (ii) the off-runway indicator, and (iii) the engine off indicator. When an indicator is asserted, it means the condition is currently underway. For example, when the WOW indicator is asserted, the weight is on the wheels, i.e., the aircraft is on the ground. When an indicator is described as off or de-asserted, the condition is not currently happening.

The historical database 112 keeps track of the engine (FIG. 2, 302) age, maintenance status, number of flights, performance, and the like. In various embodiments, the historical database 112 also stores an initial heat dissipation factor for the engine 302 that was provided by the manufacturer of the engine 302. The historical data is used by the controller 104 to provide an important adaptive function on the on the initial heat dissipation factor of the engine 302. In FIG. 1, the historical data database 112 is shown as being internal to controller 104, but in some embodiments, some or all of the historical data is external to controller 104.

The controller 104 performs the functions of the adaptive ground safety lighting system 102. As used herein, the term "controller" may be interchanged with the term "module;" each refers to any means for facilitating communications and/or interaction between the elements of the system 102 and performing additional processes, tasks and/or functions to support operation of the system 102, as described herein. In various embodiments, the controller 104 may be any hardware, software, firmware, electronic control component, processing logic, and/or processor device, individually or in any combination. Depending on the embodiment, the controller 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 1, an embodiment of the controller 104 is depicted as a computer system comprising a processor 150 and a memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. Specifically, the memory 152 stores instructions and applications 160. Information in the memory 152 may be organized and/or imported from an external source during an initialization step of a process; it may also be programmed via a user input device 114. During operation, the processor 150 loads and executes one or more programs, algorithms and rules embodied as instructions and applications 160 contained within the memory 152 and, as such, controls the general operation of the controller 104 as well as the system 102.

The novel lighting program 162 includes rules and instructions which, when executed by the processor 150, convert the processor 150/memory 152 configuration into the controller 104 that performs the functions, techniques, and processing tasks associated with the operation of the system 102. The lighting program 162 specifically directs the processing of the cockpit data 107, sensed data from the connected lighting edge nodes 110, historical data, etc., to construct the environmental map around the perimeter of the aircraft 100 and to command the connected-light assembly 108 to illuminate in accordance with the constructed environmental map. Novel program 162 and associated stored variables 164 may be stored in a functional form on computer readable media, for example, as depicted, in memory 152. While the depicted exemplary embodiment of the controller 104 is described in the context of a fully functioning computer system, those skilled in the art will recognize that the mechanisms of the present disclosure are capable of being distributed as a program product 166.

As a program product 166, one or more types of non-transitory computer-readable signal bearing media may be used to store and distribute the program 162, such as a non-transitory computer readable medium bearing the program 162 and containing therein additional computer instructions for causing a computer processor (such as the processor 150) to load and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized as memory 152 and as program product time-based viewing of clearance requests in certain embodiments.

In various embodiments, the processor/memory unit of the controller 104 may be communicatively coupled (via a bus 155) to an input/output (I/O) interface 154, and a database 156. The bus 155 serves to transmit programs, data, status and other information or signals between the various components of the controller 104. The bus 155 can be any suitable physical or logical means of connecting computer systems and components. This includes, but is not limited to, direct hard-wired connections, fiber optics, infrared and wireless bus technologies.

The I/O interface 154 enables intra controller 104 communication, as well as communications between the controller 104 and other system 102 components, and between the controller 104 and the external data sources via the communication system and fabric 124. The I/O interface 154 may include one or more network interfaces and can be implemented using any suitable method and apparatus. In various embodiments, the I/O interface 154 is configured to support communication from an external system driver and/or another computer system. In one embodiment, the I/O interface 154 is integrated with the communication system and fabric 124 and obtains data from external data source(s) directly. Also, in various embodiments, the I/O interface 154 may support communication with technicians, and/or one or more storage interfaces for direct connection to storage apparatuses, such as the database 156.

In some embodiments, the database 156 is part of the memory 152. In various embodiments, the database 156 is integrated, either within the controller 104 or external to it. Accordingly, in some embodiments, cartesian patterns and/or terrain maps are pre-loaded and internal to the controller 104.

Figure 3:
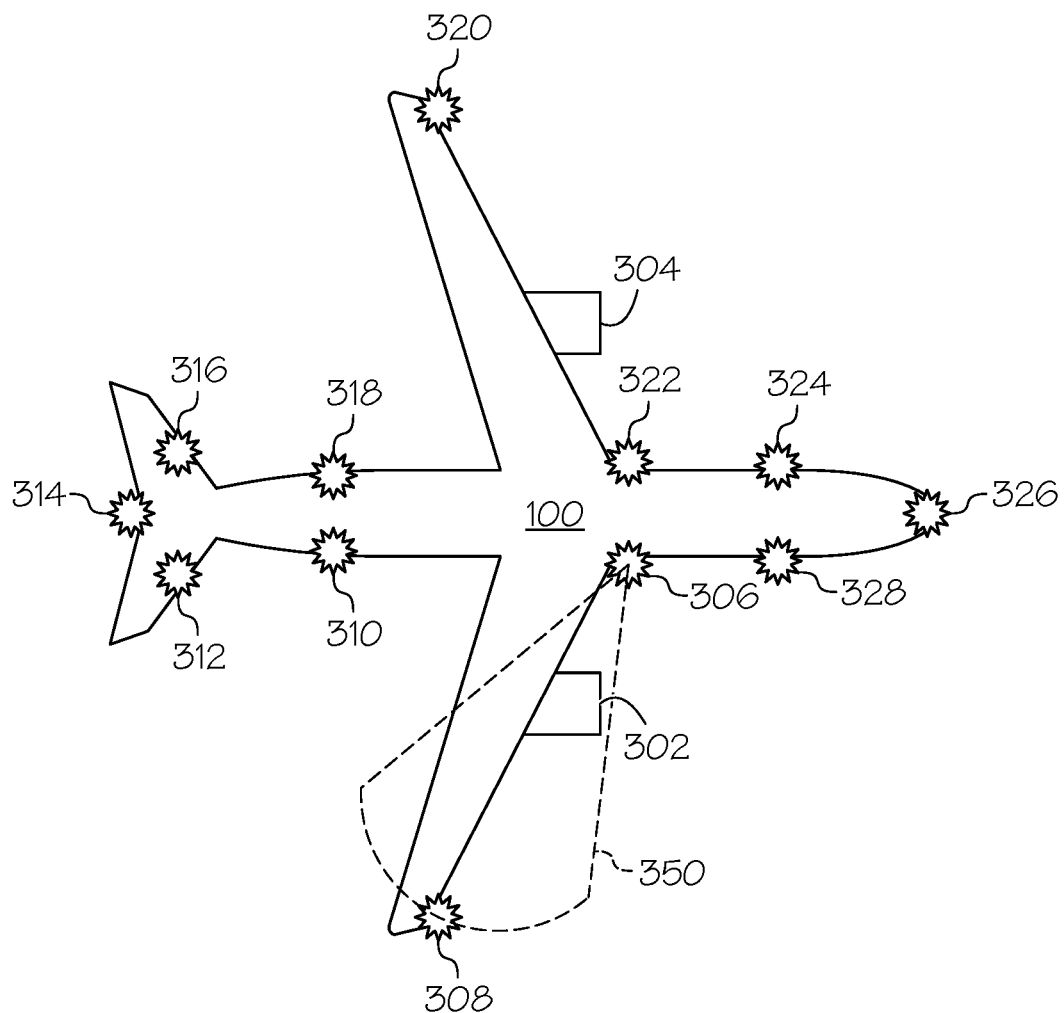
FIGS. 3-4 are illustrations of use scenarios for the adaptive ground safety lighting system for an aircraft, in accordance with an exemplary embodiment.
Figure 4:
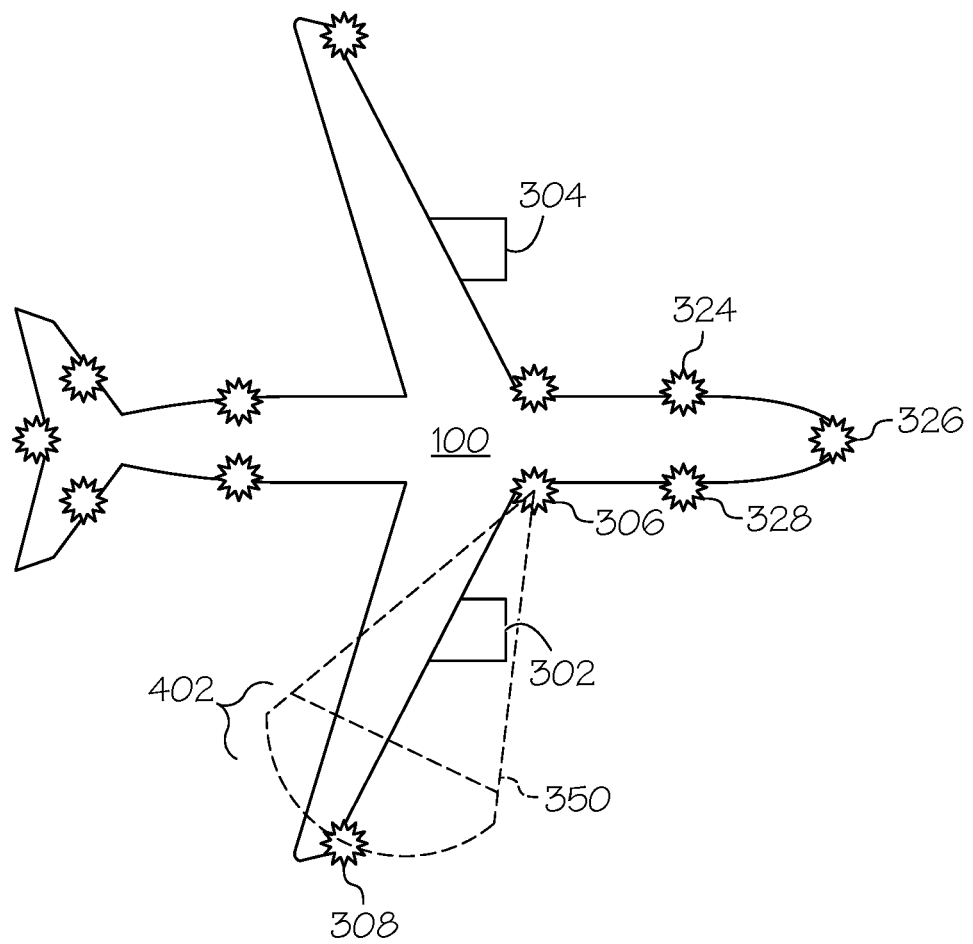

Turning now to FIGS. 3-4, the aircraft 100 is shown with engine 302 and engine 304. A connected-light assembly 108 comprising a plurality (N) of connected lighting edge nodes (306, 308, 310, 312, 314, 316, 318, 320, 322, 324, and 326, 328) is depicted. It is to be appreciated that, in practice, it is likely that there will be many more connected lighting edge nodes 110 than are depicted in these figures. The plurality of connected lighting edge nodes (306, 308, 310, 312, 314, 316, 318, 320, 322, 324, and 326, 328) are arranged/ distributed around the external surface of the aircraft 100. Additionally, their spacing may vary from the spacing shown in the figures. For example, the plurality of connected lighting edge nodes (306, 308, 310, 312, 314, 316, 318, 320, 322, 324, and 326, 328) may be equally spaced, or may be spaced in accordance with functions or features of the aircraft 100. Moreover, while the arrangement/distribution of the connected lighting edge nodes 110 and the environmental map are illustrated as if they are two-dimensional, in practice, each of these are understood to be three-dimensional: i.e., have a vertical component, such as, some connected lighting edge nodes 110 being closer to the ground and others being near a top surface of the aircraft 100. When a connected-light assembly 108 is referred to herein, it is understood to include (i) the N connected lighting edge nodes 110 that are included, and (ii) the arrangement/ distribution of the N connected lighting edge nodes 110. Each of the connected lighting edge nodes 110 is continually sensing temperature and wind and is continually providing a temperature measurement and a wind measurement.

When the controller 104 (i.e., processor 150, programmed with lighting program 162) detects a concurrent occurrence of (i) the WOW indicator asserted, (ii) the off-runway indicator asserted, and (iii) the engine off indicator asserted, responsive thereto, the controller 104 constructs an environmental map around the aircraft 100 by associating received sensed data with a location on the surface of the aircraft, for each of the plurality of connected lighting edge nodes. In FIG. 3, the illumination of the plurality of connected lighting edge nodes creates a three-dimensional visual alert to ground staff of a caution zone 350 of concern related to heat from the engine 302. In FIG. 4, a subset 402 of the three-dimensional caution zone 350 is further identified and distinguished in the three-dimensional visual alert to ground staff, for example, by projecting a different color light than the remainder of the caution zone 350. This example may be used to communicate, for example, a warning zone in subset 402 area, wherein the temperature is also quite high, but not as critical of a concern as it is in the remainder of the caution zone 350.

Additionally, it may be appreciated that the controller 104 may generate a similar caution volume for one or more other engines, such as engine 304.

Figure 5:
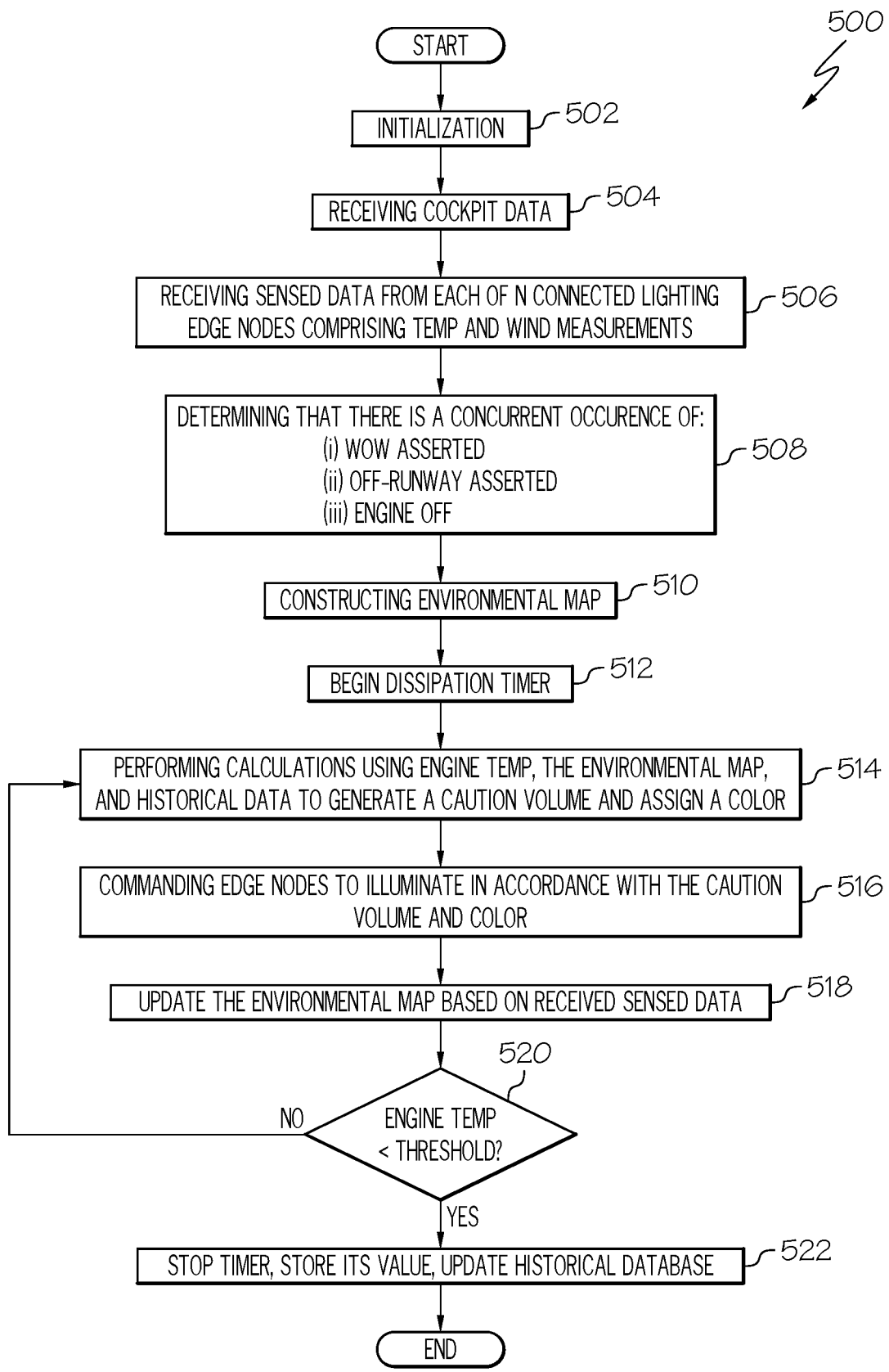
FIG. 5 is a method for adaptive ground safety lighting, in accordance with an exemplary embodiment.

The system 102 described above may be implemented by a processor-executable method for adaptive ground safety lighting 500, as shown in the flow chart of FIG. 5. For illustrative purposes, the following description of method 500 may refer to elements mentioned above in connection with FIG. 1. In practice, portions of method 500 may be performed by different components of the described system. It should be appreciated that method 500 may include any number of additional or alternative tasks, the tasks shown in FIG. 5 need not be performed in the illustrated order, and method 500 may be incorporated into a more comprehensive procedure or method having additional functionality not described in detail herein. Moreover, one or more of the tasks shown in FIG. 5 could be omitted from an embodiment of the method 500 as long as the intended overall functionality remains intact.

The method starts, and at 502 the control module 104 is initialized. As mentioned above, initialization may comprise uploading or updating instructions and applications 160, lighting program 162, temperature thresholds used to distinguish alert levels (e.g., caution zone 350 and warning zone 402), an initial heat dissipation factor for the engine, and the historical data.

At 504, the cockpit data 107 is received. At 506, the sensed data comprising a temperature measurement and wind measurement, is received from each connected lighting edge node 110 in the connected-light assembly 108. At 506, it is understood that each connected lighting edge node 110 in the connected-light assembly 108 is also transmitting its location on the surface of the aircraft 100 along with its sensed data. At 508, the method detects, based on the received cockpit data 107, a concurrent occurrence of (i) the WOW indicator asserted, (ii) the off-runway indicator asserted, and (iii) the engine off indicator asserted.

Responsive to 508, the method moves to operation 510, constructing an environmental map around the aircraft 100, which is achieved, at least in part, by associating received sensed data with a location on the surface of the aircraft, for each of the plurality of connected lighting edge nodes.

When the environmental map is constructed, the method moves to begin a dissipation timer at 512. The first construction of the environmental map, therefore, occurs at time zero, and it becomes a reference for future environmental maps. It is understood that each time an environmental map is constructed, the current or real-time sensed data from the plurality of connected lighting edge nodes 110 is used. Once the dissipation timer is started, the following operations are executed.

At the elapse of preprogrammed increments of time, at 514, the method (i) generates a caution volume 350 surrounding the engine 302, and assigns a color to the caution volume 350 as a function of at least the engine temperature, the environmental map, and the heat dissipation factor. It is understood that each time this operation is executed, the current or real-time measurements of the engine temperature are used. In various embodiments, generating a caution volume 350 includes referencing a stored heat dissipation factor. The stored heat dissipation factor is the initial heat dissipation factor provided by the engine 302 manufacturer. In various embodiments, depending on other aspects of the historical data, such as age of the engine 302, number of flights, and most recent maintenance, the controller 104 may modify the initial heat dissipation factor based on other historical data, in the generation of the caution volume 350 at 514.

At 516, the controller 104 performs the operation of commanding the plurality of connected lighting edge nodes 110 in the connected-light assembly 108 to illuminate in accordance with the caution volume 350 and assigned color, thereby achieving the illuminated caution volume 350. As may be appreciated, in this example, only a subset of the plurality of the connected lighting edge nodes 110 in the connected-light assembly 108 are participating in the illumination of the caution volume 350. In some embodiments, at this step, the connected lighting edge nodes 110 that are not participating in the caution volume 350 may be commanded to assume a standardized or standby orientation and illumination color. At operation 518, the controller 104 updates the environmental map based on received sensed data from each of the plurality of connected lighting edge nodes 110. At 520, the controller 104 repeats (i)-(iii) until the engine 302 temperature is less than a first temperature threshold.

When the engine temperature is less than the first temperature threshold at 520, the controller 104 stops the dissipation timer, stores its value in the historical database 112, and updates the historical data (e.g., increments a number of flights) based on the dissipation timer value. When the engine 302 temperature is less than the first threshold, the controller 104 may cease the illumination of the caution volume 350 or may command the participating connected lighting edge nodes 110 to return to the standby illumination color and/or orientation.

In some embodiments, after operation 520 and before operation 522, the color assigned to the caution volume 350 is a first color, and the controller 104 further identifies a subset 402 of the caution volume 350 as being less than a second temperature threshold but greater than the first temperature threshold, and assigns a second color to the subset 402 of the caution volume 350 when it is less than the second temperature threshold but greater than the first temperature threshold. In practice, the first color might be red, indicating a first visual alert zone of highest heat (in the area closest to the engine 302), and the second color might be amber, indicating a second visual alert zone in which the temperature in the subset 402 area is hot, but not as hot as the temperature in the first visual alert zone, which is the remainder of the caution volume 350.

In some embodiments, the controller 104 further generates the caution volume 350 surrounding the engine 302 further based on a received ATC clearance command.

Thus, the proposed adaptive ground safety lighting system 102 is a technologically improved ground safety system for visual alerting as to the engine temperature. The adaptive ground safety lighting system 102 enables easy augmentation for any aircraft equipped with a connected-light assembly of connected lighting edge nodes and does not require any special or additional instrumentation and equipage. As is readily appreciated, the above examples of the system 102 are non-limiting, and many others may be addressed by the controller 104.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An adaptive ground safety lighting system for an aircraft, comprising:
    a connected-light assembly comprising a plurality of connected lighting edge nodes distributed around an external surface of the aircraft, each connected lighting edge node of the plurality of connected lighting edge nodes comprising a light head, a transceiver, a temperature sensor, and a wind sensor;
    a source of cockpit data providing a weight on wheels (WOW) indicator, an off-runway indicator, an engine off indicator, and an engine temperature;
    a source of historical data; and
    a controller with a processor programmed to:
    receive the cockpit data;
    receive, from each connected lighting edge node in the connected-light assembly, respective sensed data comprising a temperature measurement and wind measurement; and
    upon a concurrent occurrence of (a) WOW indicator asserted, (b) off-runway indicator asserted, and (c) engine off indicator asserted:
    construct an environmental map around the aircraft by associating received sensed data with a location on the external surface of the aircraft, for each of the plurality of lighting edge nodes;
    begin a dissipation timer; and
        (i) perform a calculation using the engine temperature, the environmental map, and the historical data, to generate a caution volume surrounding the engine, and to assign a color to the caution volume;
        (ii) command the plurality of lighting edge nodes to illuminate in accordance with the caution volume and color;
        (iii) update the environmental map based on received sensed data from each of the plurality of lighting edge nodes;
        and
        (iv) compare engine temperature to a first temperature threshold;
    repeat (i)-(iv) when the engine temperature is not less than the first temperature threshold;
    stop the dissipation timer and store its value when the engine temperature is less than the first temperature threshold; and
    update the historical data based on the dissipation timer value when the engine temperature is less than the first temperature threshold.

2. The adaptive ground safety lighting system of claim 1, further comprising a source of an air traffic control (ATC) clearance command, and wherein the processor is further programmed to generate the caution volume surrounding the engine further based on a received ATC clearance command.

3. The adaptive ground safety lighting system of claim 2, wherein the color assigned to the caution volume is a first color, and wherein the processor is further programmed to:
    identify a subset of the caution volume as being less than a second temperature threshold; and
    assign a second color to the subset of the caution volume while it exceeds the first temperature threshold.

4. The adaptive ground safety lighting system of claim 3, wherein the historical data includes an initial heat dissipation factor for the engine.

5. The adaptive ground safety lighting system of claim 4, wherein the processor is further programmed to modify the initial heat dissipation factor for the engine based on other historical data.

6. The adaptive ground safety lighting system of claim 5, wherein each connected lighting edge node of the plurality of connected lighting edge nodes has a unique location on and around the external surface of the aircraft and is configured to share its location and sensed information with the processor.

7. The adaptive ground safety lighting system of claim 6, wherein the processor is further programmed to:
  determine a respective luminous intensity for each connected lighting edge node; and
  the command to the plurality of lighting edge nodes to illuminate in accordance with the caution volume and color includes, for each of the plurality of lighting edge nodes, the respective luminous intensity.

8. The adaptive ground safety lighting system of claim 7, wherein the processor is further programmed to:
  when the engine temperature is less than the first temperature threshold, command each of the plurality of lighting edge nodes to assume a standby orientation and illumination color.

9. A method for adaptive ground safety lighting for an aircraft, comprising:
  at a controller comprising a processor programmed with a lighting program, performing the operations of:
  receiving cockpit data providing a weight on wheels (WOW) indicator, an off-runway indicator, an engine off indicator, and an engine temperature;
  receiving, from a connected-light assembly comprising a plurality of connected lighting edge nodes on an external surface of the aircraft, respective sensed data comprising a temperature measurement and a wind measurement;
  determining that there is a concurrent occurrence of (a) WOW indicator asserted, (b) off-runway indicator asserted, and (c) engine off indicator asserted; and
  responsive to the concurrent occurrence of (a), (b), and (c):
  constructing an environmental map around the aircraft by associating received sensed data with a location on the external surface of the aircraft, for each of the plurality of connected lighting edge nodes;
  referencing historical data;
  beginning a dissipation timer;
    (i) performing a calculation using the engine temperature, the environmental map, and the historical data, to generate a caution volume surrounding the engine, and to assign a color to the caution volume;
    (ii) commanding the plurality of lighting edge nodes to illuminate in accordance with the caution volume and color;
    (iii) updating the environmental map based on received sensed data from each of the plurality of lighting edge nodes;
  repeating (i)-(iii) when the engine temperature is not less than a first temperature threshold; and
  stopping the dissipation timer and storing its value when the engine temperature is less than the first temperature threshold; and
  updating the historical data based on the dissipation timer value responsive to stopping the dissipation timer.

10. The method of claim 9, further comprising generating the caution volume surrounding the engine further based on a received ATC clearance command.

11. The method of claim 10, wherein the color assigned to the caution volume is a first color, and further comprising the operations of:
  identifying a subset of the caution volume as being less than a second temperature threshold; and
  assigning a second color to the subset of the caution volume while it exceeds the first temperature threshold.

12. The method of claim 11, wherein the historical data includes an initial heat dissipation factor for the engine.

13. The method of claim 12, further comprising, modifying the initial heat dissipation factor for the engine based on other historical data.

14. The method of claim 13, wherein each connected lighting edge node of the plurality of connected lighting edge nodes has a unique location on and around the external surface of the aircraft and is configured to share its location and sensed information with the processor.

15. The method of claim 14, wherein the processor is further programmed to perform the operations of:
  determining a respective luminous intensity for each connected lighting edge node; and
  commanding the plurality of lighting edge nodes to illuminate includes, for each of the plurality of lighting edge nodes, commanding the respective luminous intensity.

16. The method of claim 15, wherein the processor is further programmed to perform the operations of:
  when the engine temperature is less than the first temperature threshold,
  commanding each of the plurality of lighting edge nodes to assume a standby orientation and illumination color.

17. An adaptive ground safety lighting system for an aircraft, comprising:
  a connected-light assembly comprising a plurality of connected lighting edge nodes distributed around an external surface of the aircraft, each connected lighting edge node of the plurality of connected lighting edge nodes comprising a light head, a transceiver, a temperature sensor, and a wind sensor;
  a source of cockpit data providing a weight on wheels (WOW) indicator, an off-runway indicator, an engine off indicator, and an engine temperature;
  a source of an air traffic control (ATC) clearance command; and
  a controller with a processor programmed to:
    reference historical data;
    receive the cockpit data;
    receive an ATC clearance command;
    receive, from each connected lighting edge node in the connected-light assembly, a unique location on the external surface of the aircraft and respective sensed data comprising a temperature measurement and wind measurement; and
    upon a concurrent occurrence of (a) WOW indicator asserted, (b) off-runway indicator asserted, and (c) engine off indicator asserted,
      construct an environmental map around the aircraft by associating the received sensed data with the unique locations on the surface of the aircraft, for each of the plurality of lighting edge nodes;
      begin a dissipation timer;
      (i) perform a calculation using the engine temperature, the environmental map, the ATC clearance command, and a heat dissipation factor, to generate a caution volume surrounding the engine, and to assign a color to the caution volume;
      (ii) command the plurality of lighting edge nodes to illuminate in accordance with the caution volume and color;
      (iii) update the environmental map based on received sensed data from each of the plurality of lighting edge nodes;

(iv) compare the engine temperature to a first temperature threshold; and repeat (i)-(iv) when the engine temperature is not less than a first temperature threshold;

stop the dissipation timer and store its value when the engine temperature is less than the first temperature threshold;

command each of the plurality of lighting edge nodes to assume a standby orientation and illumination color when the engine temperature is less than the first temperature threshold; and update the historical data based on the dissipation timer value when the engine temperature is less than the first temperature threshold.

18. The adaptive ground safety lighting system of claim 17, wherein the color assigned to the caution volume is a first color, and wherein the processor is further programmed to:

identify a subset of the caution volume as being less than a second temperature threshold; and assign a second color to the subset of the caution volume while it exceeds the second temperature threshold.

19. The adaptive ground safety lighting system of claim 18, wherein the processor is further programmed to:

determine a respective luminous intensity for each connected lighting edge node; and the command to the plurality of lighting edge nodes to illuminate includes, for each of the plurality of lighting edge nodes, the respective luminous intensity.

20. The adaptive ground safety lighting system of claim 19, wherein the processor is further programmed to modify an initial heat dissipation factor for the engine based on historical data.

* * * * *